July 26, 1932. M. SCHULER 1,868,769
PENDULUM FOR MEASURING TIME
Filed Oct. 15, 1930
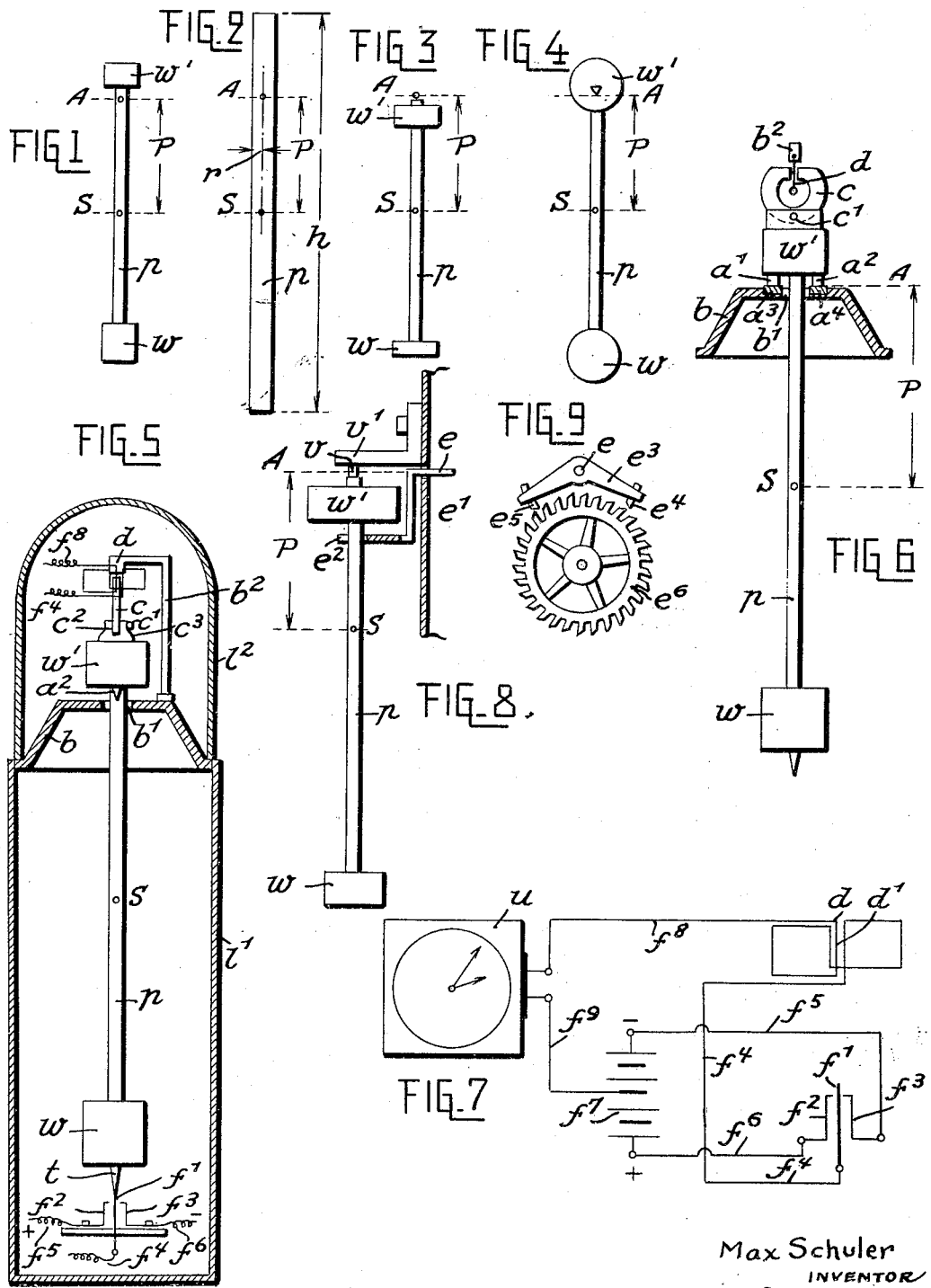
Max Schuler
INVENTOR
his atty.

Patented July 26, 1932

1,868,769

UNITED STATES PATENT OFFICE

MAX SCHULER, OF GOTTINGEN, GERMANY

PENDULUM FOR MEASURING TIME

Application filed October 15, 1930. Serial No. 488,798.

In the present devices with pendulums for measuring time, for example in pendulum clocks, pendulums are used which have a heavy weight on the bottom end of a pendulum rod whilst the top of the pendulum is suspended from a thin leaf spring or from a knife edge in such a way as to permit oscillation thereof. The period of oscillation of the pendulum is dependent upon the distance of the point of suspension from the centre of gravity of the pendulum, this distance being called the pendulum length. When the pendulum length is altered, the period of oscillation of the pendulum and consequently the movement of the clock is also altered. Thus an error in the movement of the clock may be caused, for example, by the elongation of the thin suspension spring of the pendulum which is continually bent to and fro during the oscillation.

The present invention essentially consists in that errors of this type are completely eliminated by using a pendulum in which the distance from the point of suspension to the centre of gravity of the pendulum is made equal to the radius of gyration of the pendulum body about its centre of gravity. The radius of gyration of the pendulum body is calculated by the formula $$P\sqrt{\frac{\theta}{m}}$$

In this formula P represents the radius of gyration of the pendulum, $m$ the mass of the whole pendulum body, and $\theta$ the moment of inertia of the pendulum about an axis through the centre of gravity of the pendulum body, and parallel to the axis of oscillation.

The period of oscillation of the pendulum does not then change when the distance of the point of the suspension to the centre of the gravity of the pendulum, i. e. the pendulum length is changed. A change in the pendulum length for example as a result of the stretching of the above-mentioned suspension spring does not therefore cause any error in the movement of the clock when using this new pendulum.

Several forms of construction of the invention are illustrated by way of example in the appended drawing.

Figs. 1 to 4 are diagrammatical illustrations of four different forms of construction of the pendulum as details for the general explanation of the invention.

Fig. 1 is the pendulum rod having a second weight above the point of suspension. In Fig. 2 the pendulum rod is constructed as a cylinder, and in Fig. 3 a second weight is arranged below the point of suspension, whilst in Fig. 4 it is arranged in the point of suspension.

Fig. 5 is a vertical cross-section through a construction having the pendulum arrangement according to Fig. 1. Fig. 6 is a side view of the pendulum, of the bearing of the pendulum and of the drive corresponding to Fig. 5. Fig. 7 is a diagrammatical illustration of the electrical connection for the pendulum drive of Figs. 5 and 6 together with the electric clock connected thereto. Fig. 8 is a side elevation of another construction having the pendulum arrangement according to Fig. 3, and Fig. 9 is a front elevation of a detail of the clockwork controlled by the pendulum shown in Fig. 8.

In the form of construction of the invention diagrammatically illustrated in Fig. 1, a second suitable weight $w'$ is applied to the pendulum rod $p$ above the point of suspension A at such a place that the radius of gyration P of the pendulum body about its centre of gravity S is equal to the distance of the centre of gravity S from the point of suspension A. The period of oscillation of this clock pendulum is equal to $$2\pi\sqrt{\frac{2P}{g}}$$

where $g$ is the acceleration due to gravity.

In the form of construction according to Fig. 2, the pendulum rod $p$ is constructed as a cylinder without any special weights, and this cylinder is suspended at A at a distance P from its centre of gravity S. In this case, P is calculated from the values of the cylindrical rod of Fig. 2:

$$P = \frac{1}{2}\sqrt{r^2 + \frac{1}{3}h^2}.$$

If it should be difficult to carry the pendulum rod of a clock through above the pendulum suspension as is necessary according to Fig. 2, it is possible to make the upper pendulum weight $w'$ greater and the lower weight $w$ smaller and to apply the upper pendulum weight $w'$ below the point of suspension A as in the form of construction according to Fig. 3. The normal spring suspension of the pendulum as is now used in the construction of clocks, can therefore be used also with the new pendulum.

The basic idea of the invention consists in that the distance of the point of suspension A from the centre of gravity S of the pendulum is made equal to the radius of gyration of the pendulum body about the centre of gravity. The details of the construction of the pendulum can be freely chosen according to the constructional requirements of the clock concerned. The second weight $w'$ is for example disposed on the pendulum rod $p$ at the point of suspension A in the form of construction according to Fig. 4. In this case, the second weight $w'$ is also of such magnitude and is so arranged that the distance of the centre of gravity S from the point of suspension A is equal to the radius of gyration P of the pendulum body about the centre of gravity S.

Figs. 5 and 6 show one form of pendulum, constructed according to Fig. 1, in connection with an electrically driven clock of known or suitable type.

The pendulum rod $p$ which is preferably made from Invar steel is provided at both ends with weights $w$ and $w'$ which are preferably made integral with the pendulum rod. The lower weight $w$ is greater than the upper weight $w'$ and the centre of gravity S consequently lies below the centre of the pendulum rod $p$. The distance of the axis of suspension A (Fig. 6) from the centre of gravity S is made equal to the radius of gyration calculated according to the method described above, the said axis of suspension being located beneath the upper weight $w'$. This weight $w'$ is provided with knife edges $a^1$ and $a^2$ the bearing edges of which are at a distance P from the centre of gravity S and therefore lie in the axis of suspension A. The relationships of the shape of the pendulum are therefore fulfilled according to the invention. The two edges $a^1$ and $a^2$ are disposed on two bearings (stones) $a^3$ and $a^4$ which are accommodated in suitable recesses in the bearing plate $b$ of the pendulum. The bearing plate $b$ is provided between the bearings $a^3$ and $a^4$ with an opening $b^1$ through which the pendulum rod $p$ can pass so that the pendulum can oscillate about the edges $a^1$ $a^2$.

In the present form of construction shown by way of example, the drive is effected electromagnetically. A permanent horse-shoe magnet $c$ is secured above in known manner to the weight $w'$ for example by means of a suitable screw $c^1$ in a slot $c^2$ of the extension $c^3$. When the pendulum oscillates, the magnet $c$ passes, in the position of equilibrium of the pendulum, through the centre windings $d^1$ (Fig. 7) of a coil $d$ wound in the shape of a figure 8, and secured in suitable manner to a standard $b^2$ mounted on the supporting plate $b$. The lower weight $w$ of the pendulum has a point $t$ which is adapted to bend a thin spring $f^1$ when the pendulum passes through the position of equilibrium during oscillation, until this point has passed the bent end of the spring. During the return swing of the pendulum, the thin spring $f^1$ is bent in the opposite direction by the point $t$. The spring $f^1$ is constructed as a contact which is connected to one end of the coil $d$ by the lead $f^4$ according to the diagrammatic plan of Fig. 7, and the fixed contacts $f^2$ and $f^3$ are arranged on both sides of the spring $f^1$, these contacts $f^2$ and $f^3$ being connected to a suitable source of current for example an accumulator $f^7$ by the leads $f^5$ and $f^6$. $u$ represents diagrammatically an electric clock having a polarized magnet. The clock can be of any suitable and well-known construction and consequently need not be described and illustrated in detail. As is also known, a gear wheel mounted in the clock is moved on with every change of pole by the magnet armature of the clock and thus the finger of the clock connected to it is also moved on. One pole of the armature winding of this clock $u$ is connected to the other end of the coil $d$ by a lead $f^8$, and the other pole of the armature winding of the clock is connected to the accumulator $f^7$ by a lead $f^9$. If the pendulum $p$ is oscillating to and fro, the circuit will first be closed say over the contact $f^3$ and then over the contact $f^2$ by the bending of the resilient contact $f^1$ already described and will be reversed corresponding to the direction of the current traversing the coil $d$. When the magnet $c$ of the pendulum moves into the position of equilibrium of the pendulum through the centre winding $d^1$ of the coil $d$, the pendulum will be driven either to the right or to the left by the magnet $c$ according to the direction of the current in the coil $d$. In this manner, a new driving impulse is given to the pendulum in known manner at every passage through the position of equilibrium.

For accurate timekeeping, the pendulum is preferably inserted in a gas-tight casing which consists in the present case of the lower part $l^1$ and the hood $l^2$. The casing is filled with hydrogen or helium. Any oxidation of the pendulum is avoided by this, and since the density of these gases is low the frictional effect thereof on the pendulum is correspondingly low. At the same time, these gases guarantee a satisfactory conduction of heat so that there is no need to fear any errors through differences in temperature, which can be very noticeable when there is complete vacuum in the casing.

The construction shown by way of example accordang to Fig. 8 employs the general construction of the pendulum according to Fig. 3. The upper weight $w'$ is in this case greater than the lower weight $w$ whereby the centre of gravity S falls above the centre of the pendulum rod $p$. If the radius of gyration P is now measured from the centre of gravity S then the axis of suspension A is above the upper weight $w'$ as in Fig. 3.

As a result, the pendulum can be suspended in known manner from a suitable bracket $v^1$ by means of a leaf spring $v$ as has been hitherto usual in clock pendulums.

In the present case, the drive of the pendulum is effected mechanically by ordinary clock-work with stopping of the armature in the general known manner. The shaft $e$ of the armature lies in the same horizontal line as the oscillating axis A of the leaf spring $v$. The armature shaft $e$ is cranked downwardly at $e^1$ and engages the pendulum rod with the free forked end $e^2$ so that the oscillation of the armature shaft is controlled by the oscillating pendulum.

The stopping device of the armature and the indicating mechanism of the clock can be constructed in any known manner as shown diagrammatically in Fig. 9. In this figure, $e^3$ is the armature which is mounted on the armature shaft $e$, $e^4$ and $e^5$ represent the armature pawls or detents which alternately engage in the toothed gaps of the checking wheel $e^6$ as a result of the reciprocating oscillation which is given to the shaft $e$ by the pendulum rod $p$. The type and method of operation of this checking of the armature is so generally known and usual that no special description of the same is necessary.

Modifications and changes may be made without departing from the spirit of my invention and the ambit of the appended claims.

I claim as my invention:—

1. A pendulum for measuring time in which the pendulum body is weighted and suspended in such a manner that the distance of the axis of suspension of the pendulum from the centre of gravity of the same is equal to the radius of gyration of the pendulum body about its centre of gravity.

2. A pendulum for measuring time having a second weight provided above the centre of gravity of the pendulum in addition to the usual weight arranged at the lower end, said second weight being of such magnitude and so arranged that the distance from the axis of suspension of the pendulum to the centre of gravity of the same is equal to the radius of gyration of the pendulum body about its centre of gravity.

3. A pendulum for measuring time having a second weight provided above the axis of suspension of the pendulum in addition to the usual weight arranged on the lower end of the same, said second weight being of such magnitude and being so arranged that the distance of the axis of suspension from the centre of gravity of the pendulum is equal to the radius of gyration of the pendulum body about the centre of gravity.

4. A pendulum for measuring time having a second weight provided above the centre of gravity of the pendulum in addition to the usual weight arranged on the lower end of same, said second weight having such magnitude and being so arranged below the axis of suspension of the pendulum that the distance of the axis of suspension from the centre of gravity of the pendulum is equal to the radius of gyration of the pendulum body about the centre of gravity.

5. A pendulum for measuring time having a second weight provided above the centre of gravity of the pendulum in addition to the usual weight arranged on the lower end of the same, said second weight being arranged at the axis of suspension of the pendulum and having such magnitude that the distance of the axis of suspension from the centre of gravity of the pendulum is equal to the radius of gyration of the pendulum body about the centre of gravity.

In testimony whereof I have affixed my signature.

MAX SCHULER.